(12) United States Patent
Blanck et al.

(10) Patent No.: US 8,888,147 B2
(45) Date of Patent: Nov. 18, 2014

(54) MOUNTING OF A CONTAINER IN A PASSENGER COMPARTMENT OF A MOTOR VEHICLE

(75) Inventors: Matthias Blanck, Kelkheim (DE); Michael Graf, Leun (DE); Andreas Dörhöfer, Flörsheim-Weilbach (DE)

(73) Assignee: GM Global Technology Operations LLC, Detroit, MI (US)

( * ) Notice: Subject to any disclaimer, the term of this patent is extended or adjusted under 35 U.S.C. 154(b) by 844 days.

(21) Appl. No.: 12/390,029

(22) Filed: Feb. 20, 2009

(65) Prior Publication Data
US 2009/0212586 A1 Aug. 27, 2009

(30) Foreign Application Priority Data

Feb. 21, 2008 (DE) .......................... 10 2008 010 393
Feb. 21, 2008 (DE) .......................... 10 2008 010 395

(51) Int. Cl.
*E05C 9/10* (2006.01)
*B60R 7/04* (2006.01)
*B60R 7/00* (2006.01)
*B60R 11/00* (2006.01)

(52) U.S. Cl.
CPC ........... *B60R 7/04* (2013.01); *B60R 2011/0007* (2013.01)
USPC ............ 292/34; 292/37; 296/24.34; 296/37.8

(58) Field of Classification Search
USPC ........... 292/4, 320, 10, 14, 16, 34, 37, 40, 60, 292/74, 159, 161, 165, 169, 140, 173, 143, 292/DIG. 43, DIG. 53; 296/24.34, 37.7, 296/37.14
See application file for complete search history.

(56) References Cited

U.S. PATENT DOCUMENTS

| | | | | |
|---|---|---|---|---|
| 113,070 A | * | 3/1871 | Loeffelholz et al. | 292/34 |
| 446,789 A | * | 2/1891 | Reed | 70/120 |
| 1,317,820 A | * | 10/1919 | Phillips | 292/36 |
| 1,559,228 A | * | 10/1925 | Devereaux | 292/169.12 |
| 1,567,662 A | * | 12/1925 | Mack | 292/34 |
| 2,913,122 A | * | 11/1959 | Lomas | 108/17 |

(Continued)

FOREIGN PATENT DOCUMENTS

| DE | 19908909 A1 | 9/2000 |
|---|---|---|
| DE | 10208886 A1 | 12/2003 |

(Continued)

OTHER PUBLICATIONS

Chinese Patent Office, Chinese Office Action dated Dec. 7, 2011 for Chinese Application No. 200910141916.8.

(Continued)

*Primary Examiner* — Kristina Fulton
*Assistant Examiner* — Alyson M Merlino
(74) *Attorney, Agent, or Firm* — Ingrassia Fisher & Lorenz, P.C.

(57) ABSTRACT

A mounting of a container in a rail pair is provided, which is disposed in a passenger compartment of a motor vehicle, and the rails of the rail pair have substantially horizontally extending guide grooves on the mutually facing sides and a projection is mounted in the container on its side facing the respective rail, and the respective guide groove has a cross section which expands from the groove base and the respective projection has a corresponding cross section which is expanded toward the container.

17 Claims, 4 Drawing Sheets

(56) References Cited

U.S. PATENT DOCUMENTS

| | | | | |
|---|---|---|---|---|
| 3,298,728 | A * | 1/1967 | Dye | 292/62 |
| 3,498,657 | A * | 3/1970 | Fontana | 292/34 |
| 3,809,414 | A * | 5/1974 | Neunherz et al. | 292/4 |
| 4,781,407 | A * | 11/1988 | Rauchhaus | 292/37 |
| 5,865,498 | A * | 2/1999 | Grogan | 296/163 |
| 6,135,529 | A * | 10/2000 | De Angelis et al. | 296/37.8 |
| 6,244,648 | B1 | 6/2001 | Gackstatter | |
| 6,278,676 | B1 * | 8/2001 | Anderson et al. | 720/654 |
| 6,572,169 | B2 | 6/2003 | Panhelleux et al. | |
| 6,669,243 | B2 * | 12/2003 | Katoh et al. | 292/34 |
| 6,932,402 | B2 * | 8/2005 | Niwa et al. | 296/24.34 |
| 7,004,527 | B2 * | 2/2006 | Niwa et al. | 296/24.34 |
| 7,156,438 | B2 * | 1/2007 | Cowelchuk et al. | 296/24.34 |
| 7,156,440 | B2 * | 1/2007 | Katagiri | 296/37.12 |
| 7,258,381 | B2 * | 8/2007 | Sturt et al. | 296/24.34 |
| 7,445,261 | B2 * | 11/2008 | Joler et al. | 296/24.34 |
| 7,455,333 | B2 * | 11/2008 | Ookawara | 292/34 |
| 7,543,874 | B2 * | 6/2009 | Ogura et al. | 296/37.8 |
| 7,591,498 | B2 * | 9/2009 | Busha et al. | 296/24.34 |
| 2005/0242604 | A1 * | 11/2005 | Bonnes et al. | 296/35.1 |
| 2011/0121596 | A1 | 5/2011 | Beyer | |

FOREIGN PATENT DOCUMENTS

| | | |
|---|---|---|
| DE | 1023658 A1 | 2/2004 |
| DE | 10236582 A1 | 2/2004 |
| DE | 20200601912 U1 | 2/2007 |
| DE | 202006019121 U1 | 2/2007 |
| DE | 102009055834 A1 | 6/2011 |
| EA | 1197382 A1 | 4/2002 |
| EP | 1197382 A1 | 4/2002 |
| EP | 1245446 A1 | 10/2002 |
| JP | 11020556 A | 1/1999 |
| JP | 2001158300 A | 6/2001 |

OTHER PUBLICATIONS

German Patent Office, German Search Report for Application No. 102008010393.4, dated Oct. 1, 2008.

European Patent Office, European Search Report for Application No. 09002241.9, dated Mar. 26, 2010.

* cited by examiner

MOUNTING OF A CONTAINER IN A PASSENGER COMPARTMENT OF A MOTOR VEHICLE

CROSS-REFERENCE TO RELATED APPLICATION

This application claims priority to German Patent Application No. 102008010393.4, filed Feb. 21, 2008, and also claims priority to German Patent Application No. 102008010395.0, filed on Feb. 21, 2008, which are incorporated herein by reference in their entirety.

TECHNICAL FIELD

The invention relates to the mounting of a container in a rail pair, which is disposed in a passenger compartment of a motor vehicle, and the rails of the rail pair have substantially horizontally extending guide grooves on the mutually facing sides and a projection is mounted in the container on its side facing the respective rail, and the respective guide groove has a cross section which expands from the groove base and the respective projection has a corresponding cross section which is expanded toward the container.

BACKGROUND

A mounting of a container in a rail pair is known from DE 20 2006 019 121 U1. There, the respective rail is curved and is mounted in the area of one end in the area of the floor of the motor vehicle and in the area of the other end in a dash panel of the motor vehicle. The rail has the guide groove in its upper, substantially horizontally running region, which is open at the rear. It is therefore possible to insert the container from behind into the guide grooves of the rails of the rail pair and to mount the container or to dismount with the movement sequence reversed. The respective projection is fixedly connected to the container. In addition, a means for locking the container with respect to the rail is provided. This ensures secure holding of the container during the journey.

A disadvantage with this configuration is that the container can always only be mounted and dismounted in the longitudinal direction of the guide grooves of the rail pair. In particular, in an arrangement of the container between the front seats of motor vehicles, this is ergonomically unfavorable because dismounting or mounting can only be carried out from the seats located there behind. In addition, in this case considerable space is required in the area of the rear seats.

The mounting of a container in a rail pair of a motor vehicle is known from DE 102 08 886 A1. There, the rails have a recess on their mutually facing sides, in the upper area of the respective rail, which serves for supporting the container. The container can thus be placed onto the rails from above. In addition, underneath the mounting area of the container, the respective rail is provided with a groove which extends over the length of the rail into which a bolt pivotally mounted in the container may be pivoted. This ensures, on the one hand, that the container and the rail are clamped, and on the other hand that the container cannot be raised from the rail pair. In an alternative configuration it is proposed to provide the container with an extendable locking member and instead of the groove in the rail, to provide this with a plurality of holes into which the locking member engages in the respective position of the container. This ensures that instead of locking the container by means of clamping, the container is locked by form closure. A disadvantage with this mounting is the inadequate guidance of the container in the rail pair due to the supporting of the container on the rails so that frictional forces between container and rails influencing the displaceability of the container only result from the weight of the container, but not from a design of the arrangement of container and rails. Furthermore, the configuration of the mounting is laborious from the point of view of the clamping or locking of the container.

DE 102 36 582 A1 describes a mounting of a container in rail pair disposed in a passenger compartment of a motor vehicle, and the container is provided with swivel-mounted locking levers at the front and rear and on both sides. The respective locking lever is mounted about an axis disposed above the allocated rail in the container and has a projection which can be inserted into a guide groove of the rail. The respective locking levers are pre-tensioned in the direction of insertion. They can be moved back against the force of springs so that they disengage from the guide grooves and the container can therefore be removed from the rails.

DE 199 08 909 A1 describes a mounting of a container in a rail pair which is disposed in a passenger compartment of a motor vehicle. There, a lid and a depositing tray of the container, which is closeable by means of the lid, are displaceable independently of one another in the rails. Various relative positions with respect to one another between the lid and the depositing tray are possible by mutual engagement. It is possible as desired to engage the depositing tray with the lid or to adjust a state in which the lid and the depositing tray are moveable with respect to one another. Depending on which of the two possibilities is used, either the lid is either displaceable by itself alone or necessarily together with the depositing tray.

JP 2001158300 A describes a mounting of the container in a rail pair which is disposed in a passenger compartment of a motor vehicle, in which a pin pre-tensioned by means of spring force is provided for locking container and rail. In the locking position of the container, the locking pin can be inserted into an opening of the guide rail.

In view of the foregoing, at least object of the present invention is to further develop a mounting of the type specified initially so that simple and ergonomically favorable mounting and dismounting of container and rail pair is ensured with a structurally simple configuration of the mounting. In addition, other objects, desirable features, and characteristics will become apparent from the subsequent summary and detailed description, and the appended claims, taken in conjunction with the accompanying drawings and this background.

SUMMARY

The at least one object, other objects, desirable features, and characteristics, are achieved in a mounting of the type specified initially where the respective projection is part of a bolt mounted displaceably in the container, and a spring acts on the bolt and its projection is pretensioned against the guide groove and the bolt is movable from the guide groove by means of a control member mounted in the container against the force of a spring.

According to an embodiment of the invention, therefore, on each of the two sides of the container which is allocated to the rail of the rail pair, a bolt is mounted displaceably in the container, this bolt having a projection. Under the action of the spring, the bolt is moved in the area of its projection toward the guide groove with the result that in the longitudinal extension of the guide groove a frictional connection is produced between container and rail. Due to the configuration of the cross-section of the projection and the cross section of the guide groove, a positive connection between projection and rail is obtained perpendicular hereto. This produces a play-free mounting with the possibility of displacing the container relative to the rails on overcoming the frictional connection. The pretension exerted by the spring can thus be dimensioned such that the container is not automatically displaced with respect to the rails under the usual acceleration or braking forces acting in the motor vehicle.

The displaceable mounting of the bolts then makes it possible to selectively slide the container along or secure the container within the rail pair, or to remove the container perpendicularly to the plane connecting the rails or to mount it in the reverse direction of movement when the bolts are completely inserted in the container. It is therefore not necessary to displace the container to the rear in order to release this from the rail pair.

In the mounting according to an embodiment of the invention, the centering of the container is achieved by means of the particular cross-sectional shape of the guide groove and projection. The distal portion of the projection is in particular configured as a truncated cone and the guide groove has, in cross-section, an upper inclined surface and a lower inclined surface defining a corresponding frustro-conical cross section. Due to the interaction of the bolt with its projection, the bolt having a circular cross section, a linear contact takes place between projection and rail. With such a cross-sectional configuration, particularly favorable sliding properties are achieved between container and rails. This is then particularly advantageous if means for locking container and rails are additionally provided. That is, when the bolt is pretensioned against the guide groove, the distal portion contacts the upper and lower inclined surfaces to thereby secure the container within the rail pair; and the container is slidable along the rail pair when the bolt is moved away from (i.e., out of) the guide groove. Favorable sliding properties can then be achieved in particular if the bolt consists of plastic, in particular of a polyoxymethylene plastic. The guide groove can also be provided with an optimized surface with respect to sliding properties. In this case, this preferably comprises an anodized surface.

In the mounting according to an embodiment of the invention, the centering of the container is achieved by means of the particular cross-sectional shape of the guide groove and projection. The projection is in particular configured as a truncated cone and the guide groove has a corresponding frustro-conical cross section. Due to the interaction of the bolt with its projection, the bolt having a circular cross section, a linear contact takes place between projection and rail. With such a cross-sectional configuration, particularly favorable sliding properties are achieved between container and rails. This is then particularly advantageous if means for locking container and rails are additionally provided. Favorable sliding properties can then be achieved in particular if the bolt consists of plastic, in particular of a polyoxymethylene plastic. The guide groove can also be provided with an optimized surface with respect to sliding properties. In this case, this preferably comprises an anodized surface.

According to a particular embodiment of the invention, it is provided that the two bolts are disposed in alignment and the spring acts on the two bolts. In particular, the spring is configured as a helical compression spring, which is mounted in the two bolts. In a structurally simple configuration, both bolts can therefore be exposed to force, and specifically to the same force, so that substantially the same frictional forces are ensured between the projections disposed on both sides of the container and the guide grooves.

In a structurally particularly simple manner, the displacement of the bolt against the force of the spring by means of the control member can be achieved if the control member is pivotable about a stationary axis of the container by means of a manually actuatable actuating element, in particular an actuating handle. Preferably, two control members are pivotable simultaneously by means of the actuating element so that the bolts can be moved synchronously. The movement of the bolt by means of the control member can be accomplished in a particularly simple manner if the control member has a lever arm which engages in a groove. If a tension spring additionally acts on both control members, this not only ensures that the control members contact the bolt in a defined manner, in the sense of freedom from play and therefore a reduction in noise, but in addition, the force of this tension spring can be superimposed with the pretensioning force of the other springs which cooperate directly with the bolt.

In order to delimit the maximum extension distance of the bolt, in particular from the aspect of the container dismantled from the rail pair, it is expediently provided that the respective bolt is provided with a stop for delimiting the movement of the bolt in the direction of the guide groove. This stop may comprise a securing ring connected to the bolt or, particularly in the case of a bolt consisting of plastic; the stop is directly part of the bolt.

The mounting according to an embodiment of the invention is used in particular in a rail pair in which the respective rail is curved and is mounted in the area of one end in the floor of the motor vehicle and in the area of the other end, in the floor or in the dash panel of the motor vehicle, and the rail has the guide groove in an upper, substantially horizontally running region. In particular for manufacturing reasons, this can be open in the area of one end, in particular the rear end. However, this is not necessary.

According to a particularly preferred further embodiment of the invention, means for locked mounting of the container in the rail pair are provided, and the respective bolt is slidable by means of spring force from the housing and the respective bolt displaceably receives the means for locking, which is configured as a locking pin, and the guide groove facing this locking pin has at least one recess for receiving the locking pin, and the locking pin is furthermore pretensioned by means of spring force in the direction of this guide groove and the locking pin is displaceable by means of a control member mounted in the container in the longitudinal directions thereof, and this locking pin is provided with a stop, which contacts the bolt during displacement of the locking pin into the container.

By this means, on the one hand, secure locking of container and rail is possible, and on the other hand, simple dismounting and mounting of container and rail pair is possible.

Such a mounting of a container in a rail pair makes it possible to vertically insert the container into or remove the container from the rail pair. Furthermore, the container can be connected positively to the rail pair. In the locking function, the container is fixed positively in the rail pair. When the locking function is released, the container can be moved freely due to interaction of the projections with the guide grooves of the rails. In the removal function, the locking pins and the bolts, thus the locking pins and the projections, are moved so far from the guide grooves of the rails that vertical removal of the container is possible.

This mounting allows simple, one-handed operation for unlocking and displacement of the container. In addition, the container can be mounted ergonomically favorably.

For canceling the locking function, by actuating an actuating handle, the locking pins are preferably moved against the force of a spring inside the bolt inward from the recesses of the rail, so that displacement of the container inside the guide grooves of the rails is possible. After releasing the actuating handle, the spring withdraws the locking pins into their starting position, in particular via levers. The container is therefore engaged positively with the rail.

For removal of the container, the actuating handle is preferably moved beyond the position which allows the displacement of the container, therefore into the locking function. In this case, levers in particular actuate the locking pins and draw the bolts with the projections over a stop against the force of a spring so far into the interior of the container that it is possible to remove the container. The insertion or mounting of the container is carried out in the reverse order. A spring presses the bolt with the projections back into its starting position as far as a stop.

The function of the two-stage actuation is preferably designed in such a manner that the user perceives a discernible increase in force between the locking function and the removal function. This prevents the bolt from being withdrawn too far and therefore accidental removal of the container. For this reason, optimal matching of the force of the spring acting on the locking pins and the force acting on the bolts is required. In addition, an acoustic or haptic signal, for example, a gentle engagement, may also be provided as further securing again accidental misuse.

The mounting of the container in the rail pair is usually effected in such a manner that the container, relative to the longitudinal extension of the guide grooves, has two displaceable projections in the area of one end, which cooperate with both rails and also has two displaceable projections in the area of the other end, which cooperate with the two rails. It is sufficient to provide the locking of the container only in one end region of the container. In the other region of the container, the mounting may be restricted to an exclusive sliding mounting in the guide grooves, without locking, with the possibility of mounting or dismounting the container by insertion and extension of the bolts.

In particular, the respective bolt has a stop for delimiting the extension movement of the bolt through abutment of the stop on the housing of the container. When the container is mounted and the respective projection contacts the guide groove, the bolt does not yet abut with its stop directly against the housing. When the container is dismounted, the bolt can extend only slightly further from the housing.

In particular, the locking pin is displaceably mounted concentrically to the bolt, in a through hole in the bolt. For locking with the rail, the locking pin can be moved between a position in which the end of the locking pin facing away from the container is inserted completely into the bolt and a position in which the locking pin is retracted from the bolt with this end. In particular, the locking pin has a circular cross section and the respective recess for receiving the locking pin has a slightly larger circular cross section.

During insertion of the locking pin, its stop abuts against the bolt and accordingly therefore carries the bolt along with it during the further insertion, with the result that both the locking pin and also the bolt can be transferred into an inserted position in which dismounting of the container is possible, and the container can therefore be removed vertically.

The two control members for displacement of the two locking pins are preferably pivotable simultaneously by means of the actuating element, in particular the actuating handle and a tension spring, in particular a helical tension spring, acts on both control members. These tension springs therefore act on the locking pins in the sense of a restoring movement for transferring the locking pins into their locking position. The respective control member is therefore pretensioned by means of the spring with respect to the locking pin and specifically in a pretensioning direction which corresponds to the pretensioning direction of the respective bolt under the action of its allocated spring.

The control force can be introduced particularly simply into the locking pin if the respective control member has a lever arm which engages in a recess of the locking pin. The end of the bolt facing the guide groove is in particular provided with a radial recess which passes through the stop on the locking pin. By this means the entrainment function between locking pin and bolt can be implemented particularly simply.

In the area of the guide groove, the respective rail is preferably provided with a plurality of recesses disposed in the longitudinal direction of the guide groove so that in different longitudinal positions of the rail, the container can be locked with this.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
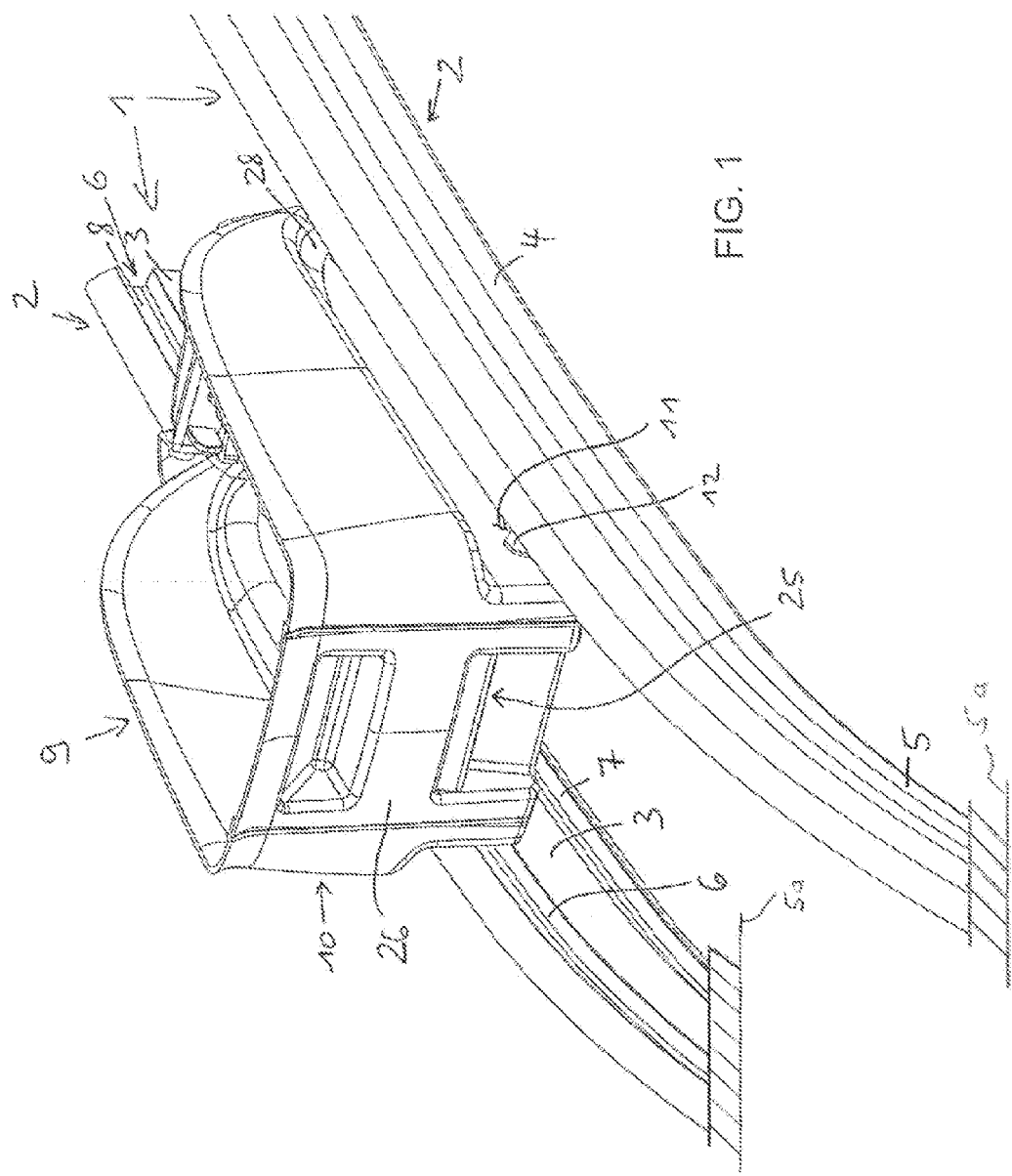
FIG. 1 shows for a first embodiment of the invention in a three-dimensional view the arrangement of a rail pair and a container mounted in the rail pair in a passenger compartment of a motor vehicle, the container being viewed obliquely from behind.
Figure 2:
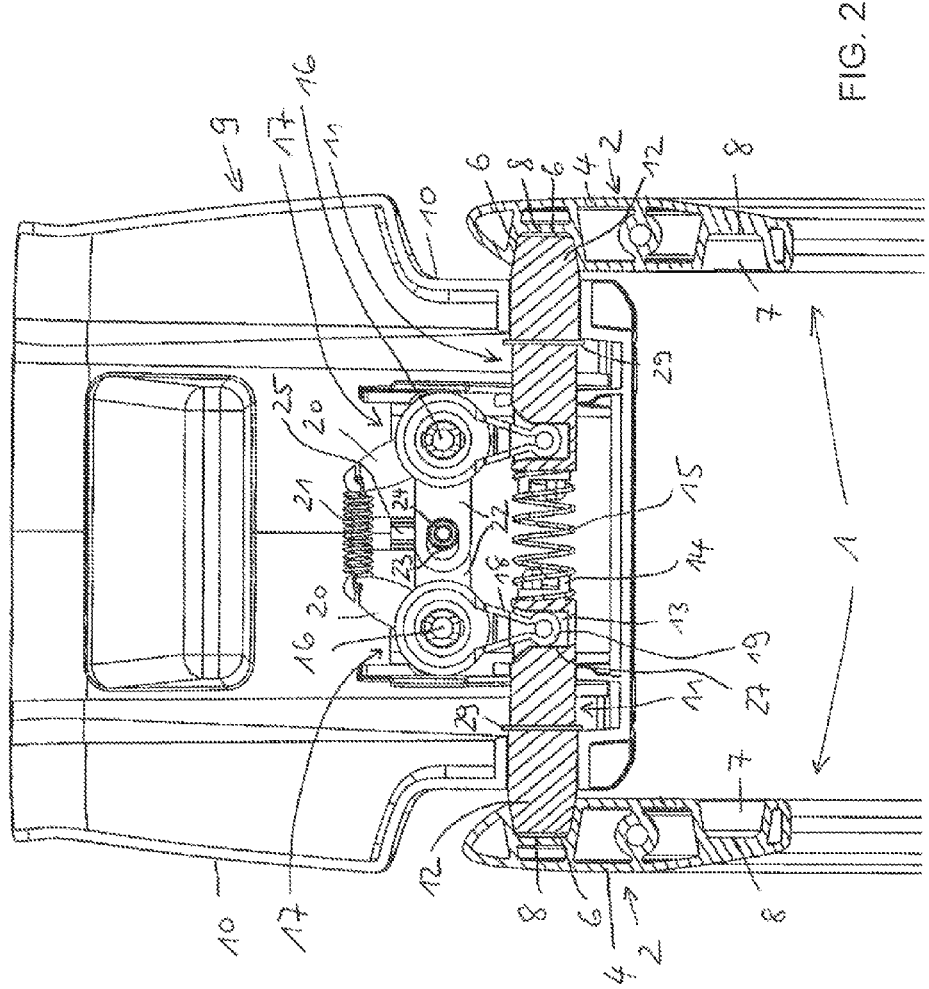
FIG. 2 shows a vertical section through the arrangement of container and rail pair shown in FIG. 1 in the area of the rear mounting of the container in the rail pair.

Embodiments according to FIG. 1 and FIG. 2: In accordance with the arrangement according to DE 20 2006 019 121 U1, a rail pair 1 is disposed in the interior of a motor vehicle in the area of its central console, wherein the respective rail 2 is configured as a free-standing bracket, which is mounted in the area of its front end in the dash panel of the vehicle in a manner not shown and is mounted in the area of its rear end in the floor 5a of the vehicle. The section 4 of the rails 2 connected to the dash panel is disposed substantially horizontally and this section 4 is adjoined by the section 5 of the rails 2, which is continuously curved in the direction of the floor of the vehicle.

Each rail 2 has two grooves 6,7 extending over their entire length and on their side facing the respectively other rail 2, which grooves each have a frustro-conical cross section which expands from the groove base 8 of the respective guide groove 6 or groove 7. The two grooves 6 of the rails 2 serve for mounting a container 9 on an upper level of the rails 2, the guide grooves 7 for mounting another container, instead of this container 9, on a lower level of the rails 2.

Only the mounting of the container 9 in the guide grooves 6, as illustrated, is of interest for understanding the embodiment of the present invention, so that reference is only made to this hereinafter. This mounting only relates to the rear area of the container 9. In the front area of the container, its mounting is likewise inside the guide grooves 6 but modified, in particular with a device for not only guiding the container 9 in the rails 2 but also for fixing the container 9 in the longitudinal extension of the guide grooves 6 relative to these. However, this will not be discussed in detail.

As can be deduced in particular from the diagram in FIG. 2, two bolts 11 are mounted displaceably in a housing 10 of the container 9 consisting of plastic. The respective bolt 11 is configured to be circular in cross section. Its end facing away from the housing interior is configured as a projection 12, which has a frustro-conical cross section, corresponding to the cross section of the guide groove 6. In the area of the end facing away from the projection 12, the bolt 11 has a recess 13 extending perpendicularly to its longitudinal extension and this end is configured as a receptacle 14 for a helical compression spring 15. This is disposed between the two bolts 11 and therefore pretensions these toward the guide grooves 6 of the rails 2, as is illustrated for the state according to FIG. 2.

The respective bolt 11 consists of a plastic having favorable sliding properties, in particular polyoxymethylene plastic. The respective rail 2, in particular its guide grooves 6 and 7, are provided with an anodized surface.

In order that the container 9 can be dismantled at the back, therefore in the area of the bolt 11 relative to the rails 2, it is necessary to insert the bolts 11 so far into the housing 10 of the container 9 that the projections 12 of the bolt 11 are moved out from the groove cross section of the guide grooves 6. This is affected by means of two control members 17 which are mounted pivotably about axes 16 in the housing 10. The respective control member 17 has a lever 18, whose spherical free end 19 engages in the recess 13 in the bolt 11 with little play in the adjusting direction of the bolt 11. On its side facing away from the lever 18, the respective control member 17 is provided with a further lever 18 and a helical tension spring 21 acts on the two levers 20. Finally, a further lever 22 is connected to the respective control member 17, this lever being directed onto the axis 16 of the other control member 17. The two levers 22 have an elongate hole 23 in the area of their free end and overlap in this area. The two elongate holes 23 pass through a pin-like projection 24 of an actuating handle 25. This projection is displaceably mounted in the rear wall 26 of the housing 10 and specifically guides an upward movement of the actuating handle 25 through manual action in the sense of the diagram in FIG. 1 to a corresponding upward movement of the projection 24 according to FIG. 2. During this upward movement of the projection 24, the two control members 17 are pivoted with different directions of rotation and the ends 19 of the lever 18 of the control members 17 move toward one another, whereby the two springs 15 and 21 are pretensioned. Due to this pivoting movement of the control members 17, the two bolts 11 are moved toward one another and the bolts 11 enter into the housing 10 of the container 9. If the actuating handle 25 is held in its actuated position, the bolts 11 remain in the inserted position and the container 9 can be raised from the rails 2 in the area of the two bolts 11 mounted at the back in the housing 10.

In order to ensure that when the container 9 is dismounted, the respective bolt 11 can only be moved out from the housing 10 by a defined extent under the action of the springs 15 and 21, the bolt 11 is provided with a stop 29, in particular a securing ring, which abuts internally against the housing 10 at the desired exit length of the bolt.

For mounting the container 9 in the area of the two bolts 11, the container 9 is positioned in its lower area between the rails 2 and the actuating handle 25 is released. Under the action of the force of the springs 15 and 21, the projections 12 of the bolt 11 are pushed out from the housing 10 and inserted into the guide grooves 7. This state is shown in FIG. 2.

The additional helical tension spring 21 helps to reduce noise since, when the actuating handle 25 is not actuated, the spring 21 presses the lever 18 of the control members 17 in a defined manner against the contact face 27 of the recess 13 when this is facing the projection.

At the front the mounting of the container 9 is affected in the area of both rails 2 via separate bearing means 28 which engage in the guide grooves 6, which may serve not only for guidance but also for locking the container 9 in this front area. Only the bearing means 28 assigned to a rail 2 is visible in FIG. 1.

The embodiments of the invention thus describes a play- or noise-free guidance and centering of the container, therefore of a module in the rail pair 1. The particular centering is achieved with the aid of a conical bolt, which is configured as a sliding bolt. When the container is located between the rails in the mounted position, the conical bolts 11 are pressed by means of spring force into the guide groove 7 of the rail 2 having the corresponding cross section. The stop 29 prevents the bolt 11 from sliding out when the container 9 is removed and on the other hand, effects a centering of the housing 10 inside the rail system. The spring 21 effects the pretensioning of the control members 17. This results in the interfaces of the control members 17 to bolts 11 and of the control members 17 to actuating handle 25 being free from play and noise. The constructive setup always allows centering of the container 9 in the rails 2 due to the position of the stop even when the tolerances of the rails 2 are unfavorable. An optimized sliding property is obtained due to the linear contact of the conical sliding bolt 11 with the guide groove 7 of the rails 2 having a complementary cross section, together with the anodized surface of the rail. This allows easy sliding of the container 9 in the rails 2.

Figure 3:
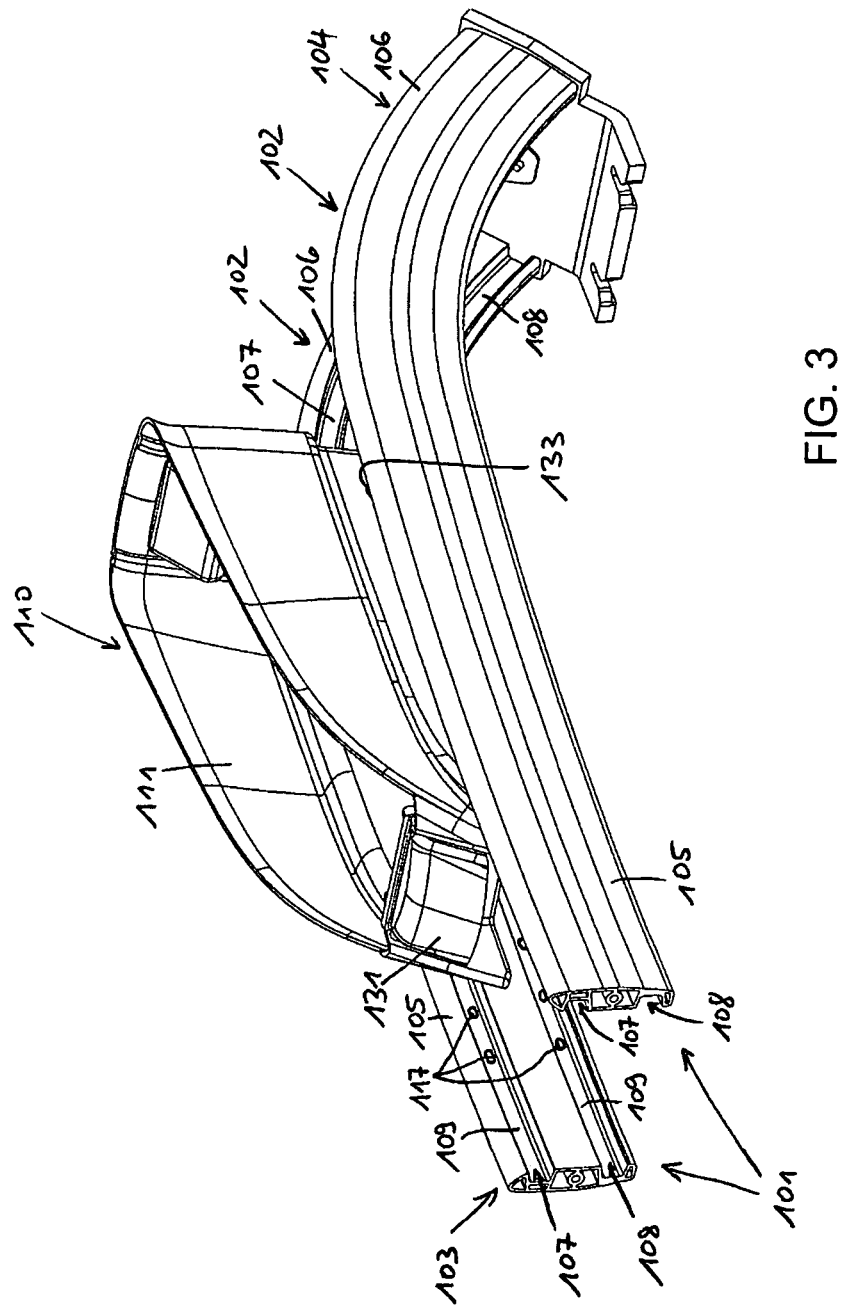
FIG. 3 shows for a second embodiment of the invention in a three-dimensional view the arrangement of a rail pair and a container mounted in the rail pair in a passenger compartment of a motor vehicle, the container being viewed obliquely from the front.
Figure 4:
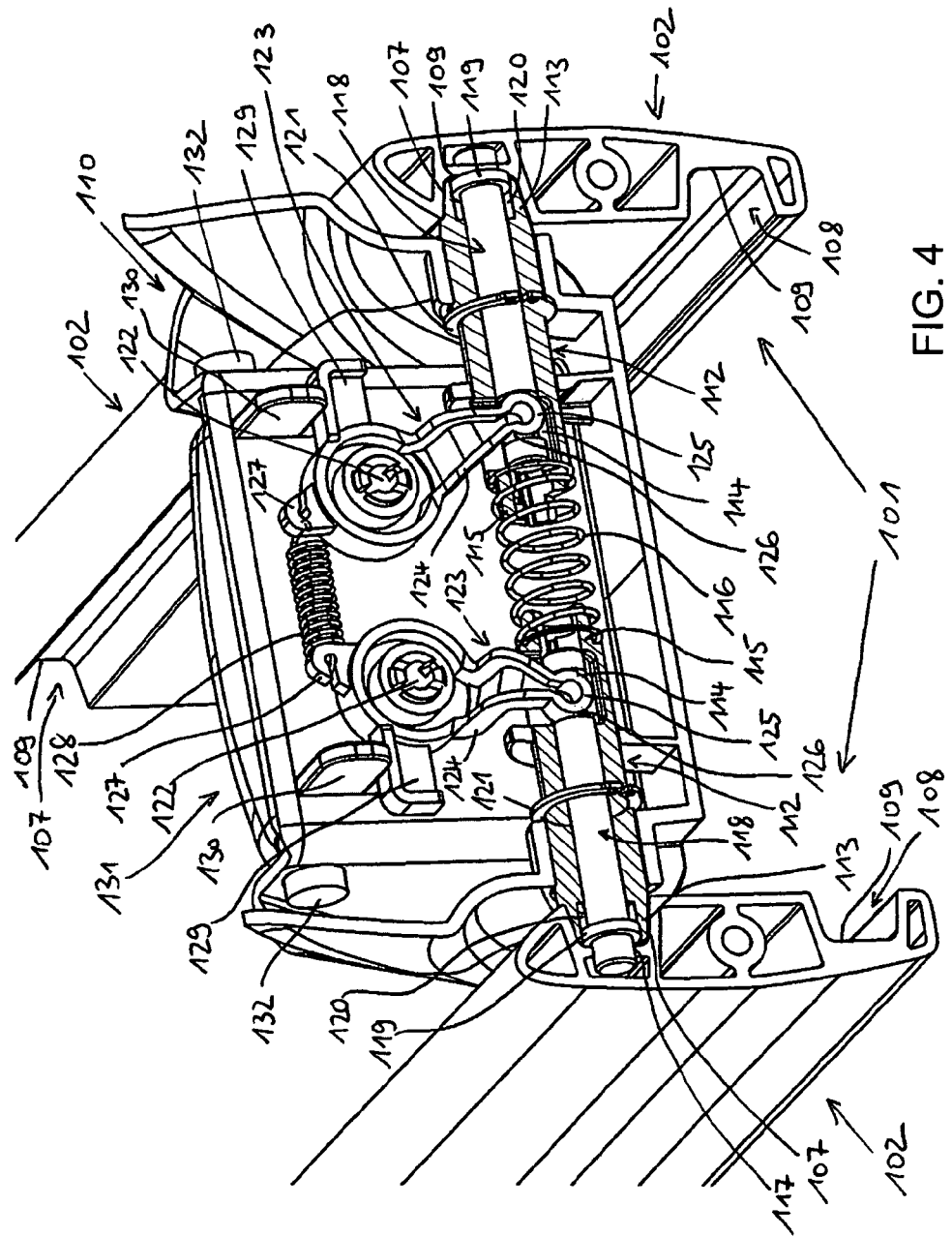
FIG. 4 shows a vertical section through the arrangement of container and rail pair shown in FIG. 3 in the area of the front mounting of the container in the rail pair.

Embodiment according to FIGS. 3 and 4: In accordance with the embodiment according to DE 20 2006 019 121 U1, a rail pair 101 is disposed in the interior of a motor vehicle in the area of its central console, and the respective rail 102 is configured as a free-standing bracket, which is mounted in the area of its front end 103 in the dash panel of the vehicle in a manner not shown and is mounted in the area of its rear end 104 in the floor of the vehicle. The section 105 of the rails 102 connected to the dash panel is disposed substantially horizontally and this section 105 is adjoined by the section 106 of the rails 102, which is continuously curved in the direction of the floor of the vehicle.

Each rail 102 has two guide grooves 107 and 108, extending over their entire length and on their side facing the respectively other rail 102, which grooves each have a frustro-conical cross section which expands from the groove base 109 of the respective guide groove 107 or 108. The two grooves 107 of the rails 102 serve for mounting a container 110 on an upper level of the rails 102, the guide grooves 108 for mounting another container, instead of this container 110, on a lower level of the rails 102.

Only the mounting of the container 110 in the guide grooves 107, as illustrated, is of interest for understanding the embodiments of the present invention, so that reference is only made to this hereinafter. This mounting only relates to the front area of the container 110. In the rear area of the container, its mounting is likewise inside the guide grooves 107 but modified, in particular with a device only for guiding the container 110 in the rails 102.

As can be deduced in particular from the diagram in FIG. 2, two bolts 112 are mounted displaceably in a housing 111 of the container 110 consisting of plastic. The respective bolt 112 is configured to be circular in cross section. Its end facing away from the housing interior is configured as a projection 113, which has a frustro-conical cross section, corresponding to the cross section of the guide groove 107. In the area of the end facing away from the projection 113, the bolt 112 has a recess 114 extending perpendicularly to its longitudinal extension and this end is configured as a receptacle 115 for a helical compression spring 116. This is disposed between the two bolts 112 and therefore pretensions these toward the guide grooves 107 of the rails 102, as is illustrated for the state according to FIG. 2.

The respective bolt 112 consists of a plastic having favorable sliding properties, in particular polyoxymethylene plastic. The respective rail 102, in particular its guide grooves 107 and 108, are provided with an anodized surface.

The respective guide groove 107 or 108 in the straight section 105 of the respective rail 102 is provided with holes 117 which pass through the groove base 109, disposed at a distance with respect to one another relative to the longitudinal extension of the section 105. These holes serve to accommodate a locking pin 118 assigned to the respective bolt 112. This has a circular cross section and is guided with little play in a through hole of the bolt 112 concentrically to the allocated bolt 112. In the area of its end facing away from the housing 111, the locking pin 118 has an outside diameter which is slightly smaller than the inside diameter of the hole 117. At a distance from this free end, the locking pin 118 is provided with a stop 119, which is guided inside a recess 120 of the bolt 112, with the result that the outside diameter of the stop 119 is adapted to the inside diameter of the recess 120. During displacement of the locking pin 118 relative to the bolt 112 in the direction of the housing 111, the stop 112 contacts the bolt 112 due to its axial movement. On the outer circumference the bolt 112 is provided with a stop 121, which is configured as a securing ring, with the result that the bolt 112 can only extend slightly further from the housing 111 than that corresponding to the contact position of projection 113 and guide groove 107 shown in the mounted state.

In order that the container 110 can be unlocked and then dismantled at the front, therefore in the area of the bolt 112 and the locking pin 118, it is necessary to insert the locking pins 118 and the bolts 112 so far into the housing 111 of the container 110 that the locking pins 118 are moved out from the holes 117 of the rails 102 and the locking pins 118 and the bolt 112 are moved out from the groove cross section of the guide grooves 107. This is affected by means of two control members 123 which are mounted pivotably about axes 122 in the housing 111. The respective control member 123 has a lever 124, whose spherical free end 125 engages in a recess 126 of the locking pin 118 located in the area of the recess 114 of the bolt 112 with little play in the adjusting direction of the locking pin 118. On its side facing away from the lever 124, the respective control member 123 is provided with an attachment 127 and a helical tension spring 128 acts on the two attachments 127. Finally, a further lever 129 is connected to the respective control member 123, this lever being directed away from the other control member 123. The two levers 129 are synchronously pivotable downward by means of adjusting levers 130, the adjusting levers 130 being part of an actuating handle 131 accessible from outside the housing 111, which is pivotable about an axis 132 mounted in the housing 111.

A pivoting movement of the actuating handle 131 by manual actions upward leads to a movement of the attachments downward and therefore to pivoting of the control members 123 against the force of the helical tension springs 128 with their ends 125 toward one another. Due to the form closure to the locking pin 118, the respective end 125 of the control member 123 carries this along with it until the stop 119 of the locking pin 118 contacts the step in the bolt 113. Once this position is reached, the locking of the container 110 is cancelled because the locking pin 118 is moved from the hole 117 of the rail 102. During the further displacement of the locking pin 118 into the interior of the housing 111, the locking pin 118 carries the bolt 112 along over the stop 119 and hereby pretensions the helical compression spring 116 more strongly. The bolt 112 is hereby moved from the guide groove 107 in the area of its bolts 113 so that the container 110 can be dismounted in this area.

When the actuating handle 131 is released when the container 110 is dismounted, the respective bolt 112 can only be extended to a limited extent under the action of the helical compression spring 116, i.e. until the stop 121 of the bolt 112 abuts against the housing.

For mounting the container 110 in the area of its front end, the container is positioned in its lower area between the rails 2 and the actuating handle 131 is released. Under the action of the force of the springs 116, the projections 113 of the bolt 112 are pushed out from the housing 111 and under the action of the springs 128, the locking pins 118 are transferred into the locking position with the holes 117. The helical tension spring 128 helps to reduce noise since, when the actuating handle 131 is not actuated; the spring presses the lever 124 of the control members 123 in a defined manner against the locking pins 118.

At the back, the mounting of the container 110 is affected by means of a simplified mounting compared with the embodiment described, as illustrated in the area of the bolt 133 indicated on one side. This is constructed largely according to that according to an embodiment of invention. However, no locking pins are provided and consequently, the respective bolt has no through hole but only the recess 114, in which the end 125 of the control member 123 engages. By actuating this control member, the movement of the bolts 112 toward one another can then be executed against the force of the springs 116 and 128. For mounting the container 110 in its rear area, it is merely necessary to bring the housing in position to the rails 2 there and release the actuating handle. Under the action of the springs, the bolts 112 then make contact with their projections 113 with the guide grooves 107.

In the mounting of the container 110, in its front area the function of the two-step actuation is designed so that a perceptible increase in force is perceived between the locking function and the removal function. This prevents the sliding bolt 112 from being withdrawn too far and therefore any accidental removal of the container 110. For this reason, the two springs 116 and 128 are matched to one another. In addition, further security against accidental misuse can be provided by an acoustic or haptic signal, for example, a slight engagement.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalent

What is claimed is:

1. A mounting structure for selectively sliding a container along and securing the container within a rail pair disposed in a passenger compartment of a motor vehicle, comprising:
    a substantially horizontally extending guide groove on a mutually facing side of each rail of the rail pair, each guide groove comprising, in cross section, an upper inclined surface and a lower inclined surface;
    at least one projection having a first portion with a substantially circular cross section mounted in the container on at least one side facing a corresponding one of the rail pair, wherein each guide groove has a cross section and the at least one projection has a second portion with a corresponding cross section, and wherein the at least one projection is part of a corresponding bolt having a substantially circular cross section and displaceably mounted in the container; and
    a first spring adapted to act on said bolt, wherein the at least one projection of the corresponding bolt is pretensioned against the corresponding guide groove and the corresponding bolt is movable from the corresponding guide groove with at least one control member mounted in the container against a force of said first spring;
    wherein said corresponding cross section of said second portion of said at least one projection is expanded toward the container forming a truncated cone and said cross section of each guide groove expands from a groove base forming a correspondingly frustoconical cross section, such that when said corresponding bolt is pretensioned against the corresponding guide groove, said at least one projection contacts said upper inclined surface and said lower inclined surface to thereby secure the container within the rail pair, and further wherein the container is slidable along the rail pair when said corresponding bolt is moved away from the corresponding guide groove.

2. The mounting structure according to claim 1, wherein at least a portion of said at least one bolt comprises plastic.

3. The mounting structure according to claim 1, wherein said guide grooves have an anodized surface.

4. The mounting structure according to claim 1, said at least one bolt comprising a first bolt and a second bolt, wherein said second bolt is disposed in alignment with said first bolt, and wherein said first spring acts on said first and second bolts.

5. The mounting structure according to claim 4, wherein said first spring is configured as a helical compression spring and is mounted on said first and second bolts.

6. The mounting structure according to claim 1, wherein said at least one control member is pivotable about a stationary axis with a manually actuatable actuating element.

7. The mounting structure according to claim 6, wherein said at least one control member is pivotable with an actuating element and a second spring.

8. The mounting structure according to claim 7, wherein said at least one control member is pretensioned with said second spring with respect to said at least one bolt.

9. The mounting structure according to claim 1, wherein said at least one control member has a lever arm that engages in a recess of said at least one bolt.

10. The mounting structure according to claim 1, wherein said at least one bolt is provided with a stop for delimiting a movement of said at least one bolt in a direction of the corresponding guide groove.

11. The mounting structure according to claim 1, wherein the corresponding bolt displaceably receives a locked mounting which is configured as a locking pin,
    wherein the corresponding guide groove that faces the locking pin and has at least one recess for receiving the locking pin,
    wherein the locking pin is furthermore pretensioned with the spring force in a direction of the corresponding guide groove and the locking pin is displaceable by the at least one control member in a longitudinal direction, and the locking pin is provided with a stop which contacts the corresponding bolt during displacement of the locking pin into the container.

12. The mounting structure according to claim 11, wherein each bolt has a stop for delimiting an extension movement of the bolt through abutment of the stop on a portion of the container.

13. The mounting structure according to claim 11, wherein the locking pin has a circular cross section and the corresponding bolt has a respective recess for receiving the locking pin with a slightly larger circular cross section than the circular cross section of the locking pin.

14. The mounting structure according to claim 11, wherein a corresponding one of the at least one control member is pretensioned with a second spring with respect to the locking pin in a pretensioning direction which corresponds to the pretensioning direction of the corresponding bolt under an action of the first spring.

15. The mounting structure according to claim 11, wherein an end of each bolt that faces the corresponding guide groove is provided with an internal recess through which the stop on the locking pin passes.

16. The mounting structure according to claim 1, wherein each rail in an area of its guide groove is provided with a plurality of recesses disposed in a longitudinal direction of the guide groove.

17. The mounting structure according to claim 1, wherein said rail pair is curved and is mounted in an area of one end in a floor of the motor vehicle; and
    wherein said guide grooves are each disposed in an upper and substantially horizontally running region of each rail.

* * * * *